US011100801B2

United States Patent
Pipe et al.

(10) Patent No.: US 11,100,801 B2
(45) Date of Patent: Aug. 24, 2021

(54) UTILIZING SENSORS TO DETECT HAZARD FROM OTHER VEHICLE WHILE DRIVING

(71) Applicant: Toyota Motor North America, Inc., Plano, TX (US)

(72) Inventors: Alyssa Pipe, Plano, TX (US); Katsumi Nagata, Foster City, CA (US); Ryan Wiesenberg, Ann Arbor, MI (US); Gunnar Heinisch, McKinney, TX (US); Clinton Williams, Saline, MI (US)

(73) Assignee: Toyota Motor North America, Inc., Plano, TX (US)

( * ) Notice: Subject to any disclaimer, the term of this patent is extended or adjusted under 35 U.S.C. 154(b) by 0 days.

(21) Appl. No.: 16/538,517

(22) Filed: Aug. 12, 2019

(65) Prior Publication Data

US 2021/0049908 A1 Feb. 18, 2021

(51) Int. Cl.
*G08G 1/16* (2006.01)
*G01C 21/34* (2006.01)
*G08G 1/01* (2006.01)

(52) U.S. Cl.
CPC ......... *G08G 1/161* (2013.01); *G01C 21/3415* (2013.01); *G08G 1/0112* (2013.01); *G08G 1/0129* (2013.01)

(58) Field of Classification Search
CPC .... G08G 1/161; G08G 1/0112; G08G 1/0129; G01C 21/3415
See application file for complete search history.

(56) References Cited

U.S. PATENT DOCUMENTS

| 7,365,769 | B1* | 4/2008 | Mager | B60Q 1/44 340/467 |
| 8,140,213 | B2 | 3/2012 | Boss et al. | |
| 8,290,665 | B2* | 10/2012 | Placke | B60W 50/14 701/43 |
| 8,521,424 | B2 | 8/2013 | Schunder et al. | |
| 8,786,421 | B2* | 7/2014 | Dozza | B60Q 5/006 340/468 |
| 9,073,430 | B1* | 7/2015 | Boss | B60K 28/066 |
| 9,086,292 | B2 | 7/2015 | Horvitz et al. | |
| 9,109,913 | B2 | 8/2015 | Lu et al. | |
| 9,240,082 | B2 | 1/2016 | Marathe et al. | |

(Continued)

FOREIGN PATENT DOCUMENTS

WO WO201817932 1/2018

*Primary Examiner* — Joseph H Feild
*Assistant Examiner* — Rufus C Point
(74) *Attorney, Agent, or Firm* — Snell & Wilmer L.L.P.

(57) ABSTRACT

Methods, systems, and apparatus for a detection system. The hazard detection system includes a first sensor configured to detect or measure first sensor data including driver behavior patterns and a second sensor configured to detect second sensor data including driving patterns of one or more other vehicles. The hazard detection system includes an electronic control unit coupled to the first sensor and the second sensor. The electronic control unit is configured to obtain the first sensor data and the second sensor data and determine that a hazardous condition is present based on the driver behavior patterns or the driving patterns. The electronic control unit is configured to alert a driver of the vehicle, the one or more other vehicles or another entity of the hazardous condition.

20 Claims, 5 Drawing Sheets

(56) References Cited

U.S. PATENT DOCUMENTS

| | | | |
|---|---|---|---|
| 9,291,474 B2 | 3/2016 | Basson et al. | |
| 9,430,944 B2* | 8/2016 | Grimm | G08G 1/096775 |
| 9,443,152 B2* | 9/2016 | Atsmon | G06F 16/29 |
| 9,475,500 B2* | 10/2016 | Grimm | G08G 1/096741 |
| 9,600,541 B2 | 3/2017 | Choi et al. | |
| 9,779,623 B2* | 10/2017 | Cudak | G08G 1/162 |
| 9,919,648 B1* | 3/2018 | Pedersen | G08G 1/048 |
| 10,001,380 B2 | 6/2018 | Annapureddy et al. | |
| 10,024,684 B2 | 7/2018 | Wang | |
| 10,235,882 B1* | 3/2019 | Aoude | G08G 1/0137 |
| 10,783,787 B2* | 9/2020 | Hourdos | G08G 1/0141 |
| 2006/0114123 A1* | 6/2006 | Eckstein | G08G 1/161 340/903 |
| 2007/0005228 A1* | 1/2007 | Sutardja | G08G 1/096716 701/117 |
| 2007/0088490 A1* | 4/2007 | Sutardja | G01S 19/14 701/117 |
| 2008/0111670 A1* | 5/2008 | Wilbrink | G08G 1/161 340/438 |
| 2009/0234543 A1* | 9/2009 | Groitzsch | B60W 10/18 701/45 |
| 2009/0299593 A1* | 12/2009 | Borchers | B60W 10/184 701/70 |
| 2010/0006363 A1* | 1/2010 | Zagorski | B60W 30/08 180/275 |
| 2010/0052944 A1* | 3/2010 | Luke | B60W 40/04 340/903 |
| 2011/0015818 A1* | 1/2011 | Breuer | B60T 8/17558 701/31.4 |
| 2012/0053805 A1* | 3/2012 | Dantu | B60W 40/09 701/70 |
| 2012/0078509 A1* | 3/2012 | Choi | G01C 21/3415 701/423 |
| 2012/0095674 A1* | 4/2012 | Lee | G08G 1/096775 701/423 |
| 2013/0338877 A1* | 12/2013 | Straus | G08G 1/161 701/41 |
| 2014/0266984 A1 | 9/2014 | Sharma | |
| 2015/0191177 A1* | 7/2015 | Boss | B60W 40/08 701/1 |
| 2015/0367858 A1* | 12/2015 | Fung | B60R 1/00 701/1 |
| 2016/0023599 A1* | 1/2016 | Jo | G08G 1/161 340/903 |
| 2016/0133131 A1* | 5/2016 | Grimm | G08G 1/096725 701/117 |
| 2017/0017734 A1 | 1/2017 | Groh et al. | |
| 2017/0032673 A1* | 2/2017 | Scofield | H04L 9/3247 |
| 2017/0122755 A1 | 5/2017 | Rovik et al. | |
| 2017/0210323 A1* | 7/2017 | Cordova | G08G 1/0141 |
| 2017/0294117 A1* | 10/2017 | Burke | G06K 9/00791 |
| 2017/0337813 A1* | 11/2017 | Taylor | G05D 1/0287 |
| 2018/0075747 A1* | 3/2018 | Pahwa | B60W 30/0956 |
| 2018/0101736 A1* | 4/2018 | Han | G06T 11/60 |
| 2018/0322783 A1* | 11/2018 | Toyoda | G08G 1/0962 |
| 2019/0130741 A1* | 5/2019 | Eastling | G08G 1/096775 |
| 2019/0139403 A1 | 5/2019 | Alam et al. | |
| 2019/0162549 A1* | 5/2019 | Fouad | G01C 21/3484 |
| 2019/0197330 A1* | 6/2019 | Mahmoud | A61B 5/6898 |
| 2019/0220011 A1* | 7/2019 | Della Penna | G08G 1/0133 |
| 2019/0287394 A1* | 9/2019 | Aoude | G08G 1/096725 |
| 2019/0303686 A1* | 10/2019 | Guo | G06K 9/3241 |
| 2019/0359214 A1* | 11/2019 | Max | B60W 30/0956 |
| 2020/0017049 A1* | 1/2020 | Kobayashi | B60R 21/0134 |
| 2020/0132503 A1* | 4/2020 | Aist | G01C 21/3415 |
| 2020/0164884 A1* | 5/2020 | Ebe | G06K 9/00785 |

* cited by examiner

UTILIZING SENSORS TO DETECT HAZARD FROM OTHER VEHICLE WHILE DRIVING

BACKGROUND

Field

This disclosure relates to crowd-sourcing data, detecting hazardous objects or situations from the crowd-sourced data and alerting other vehicles of the hazardous objects or situation while driving.

Description of the Related Art

Generally, collision prevention devices perform an action, such as sound an alarm or otherwise warn a driver, in response to a vehicle or object entering within a threshold distance of the vehicle. For example, when a vehicle attempts to merge or shift lanes, a lane change assist system may monitor the perimeter of the vehicle and alert the driver if the vehicle is in the blind spot. These systems, however, rely on a single sensor and/or a single data source to detect or determine the vehicle or the object within the threshold distance of the vehicle. When a single sensor and/or a single data source is relied upon, the single sensor and/or data source may fail or lack information to form a determination as to the danger an obstacle or situation presents. Moreover, a single sensor and/or a single data source is not as precise or accurate as crowd-sourcing data from multiple sensors and/or multiple data sources.

Once a hazardous object or situation is detected, these collision prevention devices may warn the driver to act. These collision devices, however, do not necessarily alert other surrounding vehicles or other authorities of the hazardous object or situation. Moreover, these collision prevent devices require user intervention to prevent the collision with the hazardous object.

Accordingly, there is a need for a system and method for improving the collection and analysis of environmental variables in the surrounding environment to automatically ascertain a hazard, alert others and/or otherwise act to prevent a collision with the hazard while the vehicle is in motion.

SUMMARY

In general, one aspect of the subject matter described in this disclosure may be embodied in a hazard detection system for a vehicle. The hazard detection system includes a first sensor configured to detect or measure first sensor data associated with an operation of the vehicle. The first sensor data includes driver behavior patterns. The hazard detection system includes a second sensor configured to detect second sensor data associated with a surrounding environment of the vehicle. The second sensor data includes driving patterns of one or more other vehicles. The hazard detection system includes an electronic control unit coupled to the first sensor and the second sensor. The electronic control unit is configured to obtain the first sensor data and the second sensor data. The electronic control unit is configured to determine that a hazardous condition is present based on the driver behavior patterns or the driving patterns of the one or more other vehicles. The electronic control unit is configured to alert a driver of the vehicle, the one or more other vehicles or another entity of the hazardous condition.

These and other embodiments may optionally include one or more of the following features. The electronic control unit may be configured to obtain a baseline of the driving patterns of the one or more other vehicles and the driver behavior patterns. The electronic control unit may determine that the hazardous condition is present further based on the baseline. The electronic control unit may be configured to re-route the vehicle to avoid the hazardous condition in response to determining that the hazardous condition is present.

The second sensor may be a camera. The camera may be configured to capture image data, which may be included in the second sensor data. The electronic control unit may be configured to send an alert that includes the image data to the other entity in response to determining that the hazardous condition is present.

The first sensor may be a vehicle speed sensor. The driver behavior patterns may include a speed of the vehicle. The electronic control unit may be configured to determine a difference between the speed of the vehicle and a baseline speed. The electronic control unit may be configured to determine that the difference is greater than a threshold amount. The electronic control unit may be configured to obtain a baseline of driving patterns of multiple vehicles. The electronic control unit may be configured to determine that the hazardous condition is present further based on the baseline of the driving patterns of the multiple vehicles.

The detection system may include a navigation unit. The navigation unit may be configured to obtain or determine a current location of the vehicle. The electronic control unit may be configured to provide the current location of the vehicle to an external database. The electronic control unit may be configured to obtain driving patterns of multiple vehicles that previously frequented the current location. The electronic control unit may be configured to determine that the hazardous condition is present further based on the driving patterns of the multiple vehicles that previously frequented the current location.

In another aspect, the subject matter may be embodied in a hazard detection system for a vehicle. The hazard detection system includes a sensor configured to detect sensor data including driver behavior patterns of a driver or driving patterns of the one or more other vehicles. The hazard detection system includes a memory configured to store a baseline of driver behavior patterns and driving patterns of the one or more other vehicles. The hazard detection system includes an electronic control unit coupled to the sensor. The electronic control unit is configured to determine that a hazardous condition is present based on the driver behavior patterns, the driving patterns of the one or more vehicles or the baseline. The electronic control unit is configured to control an operation of the vehicle to avoid the hazardous condition.

In another aspect, the subject matter may be embodied in a method for detecting hazardous condition. The method includes obtaining driver behavior patterns of a driver of a vehicle and driving patterns of one or more surrounding vehicles. The method includes determining that a hazardous condition is present based on the driver behavior patterns and the driving patterns of the one or more other vehicles. The method includes alerting a driver of the vehicle, a driver of the one or more other vehicles or another entity of the hazardous condition.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, apparatuses and methods for crowd-sourcing data and detecting hazardous objects or situations while driving. Particular embodiments of the subject matter described in this disclosure may be implemented to realize one or more of the following advantages. The hazard detection and alert system ("hazard detection system") crowd-sources data from multiple sensors and other devices. The hazard detection system analyzes the crowd-sourced data and detects one or more hazardous objects or situations and alerts the occupants of the vehicle of the hazardous object or situation. By crowd-sourcing, collecting or otherwise obtaining data from multiple sensors and/or other devices, the hazard detection system is more situationally aware of the environment within and/or surrounding the vehicle. Moreover, the hazard detection system may more accurately and more precisely detect a hazardous object or situation within the environment. For example, the hazard detection system may detect that the vehicle or another vehicle is driving too fast, swerving or otherwise presenting a danger to oneself or another.

Other benefits and advantages include the capability to improve hazard detection through artificial intelligence. The hazard detection system may accumulate, aggregate, and analyze data to learn and improve the models used for hazard detection. This improves the accuracy and precision of the hazardous object and situation detection and prediction.

Additionally, the hazard detection system may perform different operations to alert, avoid or otherwise mitigate consequences of the hazardous object or situation. For example, the hazard detection system may alert the driver of the presence of the hazardous object or situation. In another example, the hazard detection system may provide the information to a third-party, such as an insurance provider or authorities, to alert the third-party of the hazardous object or situation, such as a drunk driver. In another example, the hazard detection system may propose an alternative route and/or re-route the vehicle.

Figure 1:
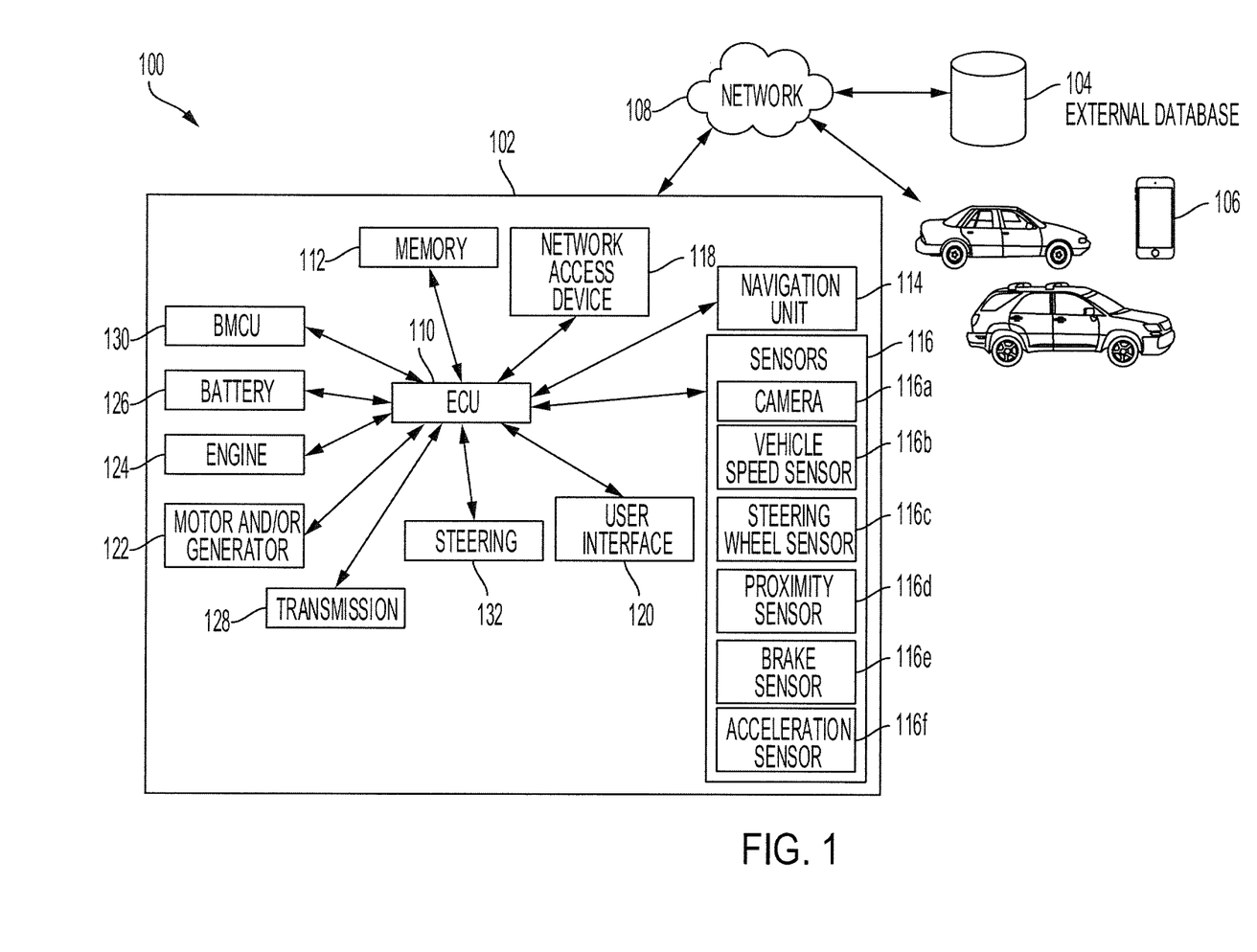
FIG. 1 is a block diagram of an example hazard detection system according to an aspect of the invention.

FIG. 1 is a block diagram of a hazard detection system 100. The hazard detection system 100 may be retro-fitted, coupled to, include or be included within a vehicle 102. The hazard detection system 100 may couple, connect to, or include an external database 104 and/or one or more other devices 106, such as another vehicle, personal device or other device. The hazard detection system 100 may have a network 108 that links the external database 104 and/or the one or more other devices 106 with the vehicle 102. The network 108 may be a local area network (LAN), a wide area network (WAN), a cellular network, the Internet, Dedicated Short-Range Communication (DSRC) network or combination thereof, that connects, couples and/or otherwise communicates among the vehicle 102, the one or more other devices 106 and the external database 104.

The hazard detection system 100 collects data related to the environment surrounding the vehicle 102 and/or the environment within the vehicle 102 from multiple data sources over time. The multiple data sources may include multiple different types or kinds of sensors, the external database 104, the one or more other devices 106 and/or other data sources. The hazard detection system 100 uses the data to identify, detect or otherwise determine hazardous objects and/or hazardous situations ("hazardous conditions") that are present in the environment. For example, the hazard detection system 100 may identify when there is an obstacle in the road, a surrounding vehicle is driving dangerously, a driver of the vehicle 102 is driving erratically or other hazardous condition.

Moreover, the hazard detection system 100 may use artificial intelligence including a machine learning algorithm to identify and detect hazardous conditions that are about to occur and that may present a danger. By collecting data from multiple sources over time and establishing baselines using the collected data, the hazard detection system 100 may improve the accuracy and precision of the detection and identification of hazardous conditions.

The hazard detection system 100 may include, be retro-fitted or otherwise coupled with the vehicle 102. A vehicle 102 is a conveyance capable of transporting a person, an object, or a permanently or temporarily affixed apparatus. The vehicle 102 may be a self-propelled wheeled conveyance, such as a car, a sports utility vehicle, a truck, a bus, a van or other motor, battery or fuel cell driven vehicle. For example, the vehicle 102 may be an electric vehicle, a hybrid vehicle, a hydrogen fuel cell vehicle, a plug-in hybrid vehicle or any other type of vehicle that has a fuel cell stack, a motor and/or a generator. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may have and use one or more sensors and/or a navigation unit to drive autonomously.

The hazard detection system 100 includes one or more processors, such as an electronic control unit (ECU) 110 and a memory 112. The hazard detection system 100 may include other components, such as a navigation unit 114, one or more sensors 116, a network access device 118 and/or a user interface 120. The hazard detection system 100 may couple, connect to, and/or include one or more vehicle components such as the motor and/or generator 122, the engine 124, the battery 126, the transmission 128, the battery management control unit (BMCU) 130 and/or the steering 132.

The ECU 110 may be implemented as a single ECU or as multiple ECUs. The ECU 110 may be electrically coupled to some or all the other components within the vehicle 102, such as the motor and/or generator 122, the transmission 128, the engine 124, the battery 126, the battery management control unit (BMCU) 130, the memory 112, the network access device 118 and/or one or more sensors 116. The ECU 110 may include one or more processors or controllers specifically designed for collecting and analyzing data to identify, detect and/or determine hazardous conditions, and in response, act to prevent, warn or otherwise mitigate consequences of the hazardous condition while the vehicle 102 is in motion. The hazardous condition may be a hazardous object or situation that may be external to the vehicle 102 and/or internal to the vehicle 102. The ECU 110 may generate predictive models and use machine learning algorithms to improve the detection and/or identification of hazardous conditions.

A hazardous condition may be an object or situation that presents a danger or hazard to the vehicle 102, occupants within the vehicle 102 and/or to other vehicles. The hazardous condition may be an object or situation that is not normally present within the external and/or internal environment of the vehicle 102 and that interferes with the operation of the vehicle 102 or the other vehicle. For example, an object, such as pothole in the path of the vehicle, may damage the vehicle 102, and thus, may be considered a hazardous condition. In another example, an object, such as a light rainfall in the path of the vehicle, would not interfere with the operation of the vehicle 102, and thus, may not be considered a hazardous condition.

The ECU 110 may obtain data of the environment within and surrounding the vehicle 102 and compare the data to a baseline and/or input the data into a model to determine, detect or otherwise identify hazardous conditions within the environment when the vehicle is in motion. If a hazardous condition is detected, the ECU 110 may notify the driver or other vehicle, re-route the vehicle to avoid the hazardous condition, provide a report of the hazardous condition to another entity, such as the police, an insurance provider or other government agency or service provider, or otherwise control the vehicle to avoid the hazardous condition or mitigate consequences of hazardous condition. The ECU 110 may be coupled to a memory 112 and execute instructions that are stored in the memory 112.

The memory 112 may be coupled to the ECU 110 and store instructions that the ECU 110 executes. The memory 112 may include one or more of a Random Access Memory (RAM) or other volatile or non-volatile memory. The memory 112 may be a non-transitory memory or a data storage device, such as a hard disk drive, a solid-state disk drive, a hybrid disk drive, or other appropriate data storage, and may further store machine-readable instructions, which may be loaded and executed by the ECU 110. Moreover, the memory 112 may be used to store image data related to the hazardous condition.

The hazard detection system 100 may include a user interface 120. The hazard detection system 100 may display one or more notifications on the user interface 120. The one or more notifications on the user interface 120 may notify occupants of the vehicle when the hazard detection system 100 is initialized or activated or when a hazardous condition is detected. Moreover, the user interface 120 may display a route or an updated route of a path of the vehicle 102. The user interface 120 may include an input/output device that receives user input from a user interface element, a button, a dial, a microphone, a keyboard, or a touch screen. For example, the user interface 120 may receive user input that may include configurations as to the amount of image data or the types of data to include when reporting the hazardous condition to a third party or other entity. The user interface 120 may provide an output to an output device, such as a display, a speaker, an audio and/or visual indicator, or a refreshable braille display.

The hazard detection system 100 may include a network access device 118. The network access device 118 may include a wireless communication port or channel, such as one or more of a Wi-Fi unit, a Bluetooth® unit, a radio frequency identification (RFID) tag or reader, Dedicated Short-Range Communication (DSRC) unit or a cellular network unit for accessing a cellular network (such as 3G, 4G or 5G). The network access device 118 may transmit data to and receive data from the external database 104 and/or the one or more other devices 106. For example, the ECU 110 may communicate with the external database 104 to obtain a baseline for a current location of the vehicle 102, via the network 108. The hazard detection system 100 may use the baseline to identify or determine hazardous conditions.

The hazard detection system 100 may include a navigation unit 114 and/or one or more sensors 116. The navigation unit 114 may be integral to the vehicle 102 or a separate unit coupled to the vehicle 102, such as a personal device with navigation capabilities. When the navigation unit 114 is separate from the vehicle 102, the navigation unit 114 may communicate with the vehicle 102 via the network access device 118. The vehicle 102 may include a Global Positioning System (GPS) unit (not shown) for detecting location data including a current location of the vehicle 102 and date/time information instead of the navigation unit 114. In that regard, the ECU 110 may perform the functions of the navigation unit 114 based on data received from the GPS unit. At least one of the navigation unit 114 or the ECU 110 may predict or propose a route set that includes a starting location and a destination location. The navigation unit 114 or the ECU 110 may perform navigation functions. Navigation functions may include, for example, route and route set prediction, providing navigation instructions, and receiving user input such as verification of predicted routes and route sets or destinations. Other information, such as a current speed of the vehicle 102 and/or a current direction of travel of the vehicle 102, may be extrapolated, interpreted or otherwise calculated from the data obtained from the navigation unit.

The navigation unit 114 may provide and obtain navigational map information including location data, which may include a current location, a starting location, a destination location and/or a route between the starting location or current location and the destination location of the vehicle 102. The navigation unit 114 may include a memory (not shown) for storing the route data. The navigation unit 114 may receive data from other sensors capable of detecting data corresponding to location information. For example, the other sensors may include a gyroscope or an accelerometer.

The one or more sensors 116 may include a camera 116a, a vehicle speed sensor 116b, a steering wheel sensor 116c, a proximity sensor 116d, a brake sensor 116e and/or an acceleration sensor 116f. The camera 116a may capture image data. The hazard detection system 100 may use the image data to identify hazardous conditions, such as a swerving vehicle or pothole, and/or may be provided in a report or communication to a third-party to provide additional information, such as an image of a license plate of the swerving vehicle.

The one or more sensors 116 may include a vehicle speed sensor 116b. The vehicle speed sensor 116b may measure the amount of rotation of the multiple wheels to determine whether the vehicle 102 is in motion and/or the speed of the vehicle 102. The one or more sensors 116 may include other sensors, such as a steering wheel sensor 116*c*, a proximity sensor 116*d*, a brake sensor 116*e* and/or an acceleration sensor 116*f*. The steering wheel sensor 116*c* may measure the amount and rate of change of the steering 132. The proximity sensor 116*d* may measure a relative distance or detect objects within a threshold distance of the vehicle 102. The brake sensor 116*e* may measure an amount of depression and/or a rate of depression of a brake pedal of the vehicle 102. In an embodiment where the vehicle 102 is driven by a battery electric system, the brake sensor 116*e* may measure the rate of release and pressure reduction of an accelerator pedal. The acceleration sensor 116*f* may measure an amount of depression and/or a rate of depression of an accelerator pedal of the vehicle 102.

The hazard detection system 100 may couple, connect to, and/or include one or more vehicle components. The one or more vehicle components may include a motor and/or generator 122. The motor and/or generator 122 may convert electrical energy into mechanical power, such as torque, and may convert mechanical power into electrical energy. The motor and/or generator 122 may be coupled to the battery 126. The motor and/or generator 122 may convert the energy from the battery 126 into mechanical power, and may provide energy back to the battery 126, for example, via regenerative braking. The vehicle 102 may include one or more additional power generation devices such as the engine 124 or a fuel cell stack (not shown). The engine 124 combusts fuel to provide power instead of and/or in addition to the power supplied by the motor and/or generator 122.

The battery 126 may be coupled to the motor and/or generator 122 and may provide electrical energy to and receive electrical energy from the motor and/or generator 122. The battery 126 may include one or more rechargeable batteries.

The BMCU 130 may be coupled to the battery 126 and may control and manage the charging and discharging of the battery 126. The BMCU 130, for example, may measure, using battery sensors, parameters used to determine the state of charge (SOC) of the battery 126. The BMCU 130 may control the battery 126.

The one or more vehicle components may include the transmission 128. The transmission 128 may have different gears and/or modes, such as park, drive and/or neutral and may shift between the different gears. The transmission 128 manages the amount of power that is provided to the wheels of the vehicle 102 given an amount of speed. The one or more vehicle components may include the steering 132, which controls the direction of the vehicle 102.

The hazard detection system 100 may include or be coupled to the external database 104. A database is any collection of pieces of information that is organized for search and retrieval, such as by a computer, and the database may be organized in tables, schemas, queries, reports, or any other data structures. A database may use any number of database management systems. The external database 104 may include a third-party server or website that stores or provides information. The information may include real-time information, periodically updated information, or user-inputted information. A server may be a computer in a network that is used to provide services, such as accessing files or sharing peripherals, to other computers in the network.

The external database 104 may be a relational database or behavioral model database that provides the baseline of normal conditions of the environment surrounding the vehicle 102 and/or normal conditions of the environment within the vehicle 102. The external database 104 may be updated and/or provide updates in real-time. The external database 104 may store and/or provide the baseline to the ECU 110. The ECU 110 may also update and/or provide information to the external database 104 to inform other drivers, other users, third-parties or other devices 106 of the hazardous condition at the location of the vehicle 102.

Figure 2:
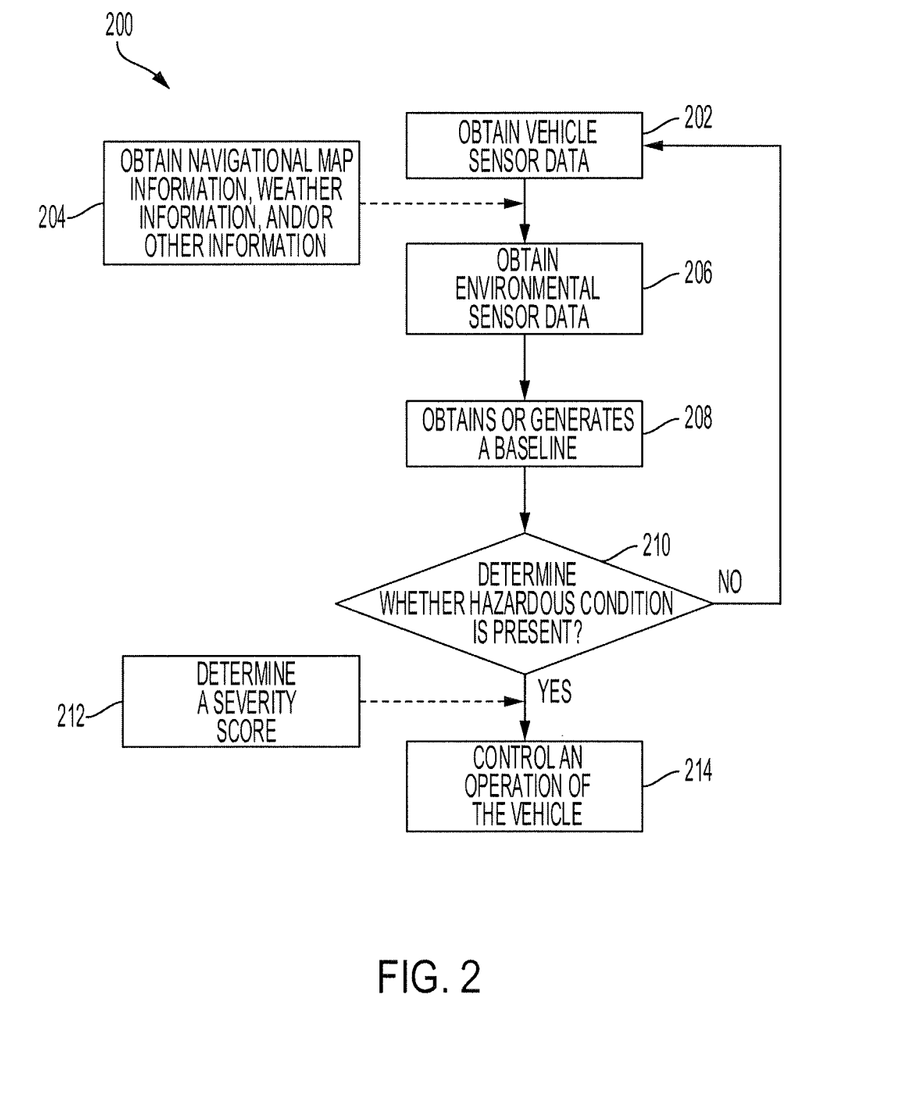
FIG. 2 is a flow diagram of an example process for collecting data from various data sources, detecting a hazardous condition, and performing an action in response to the hazardous condition using the hazard detection system of FIG. 1 according to an aspect of the invention.

FIG. 2 is a flow diagram of a process 200 for collecting data from various data sources, detecting a hazardous condition, and performing an action in response to the hazardous condition. One or more computers or one or more data processing apparatuses, for example, the ECU 110 of the hazard detection system 100 of FIG. 1, appropriately programmed, may implement the process 200.

The hazard detection system 100 obtains vehicle sensor data (202). Vehicle sensor data includes sensor data and/or image data measured, detected or otherwise captured by one or more sensors 116 included, retro-fitted or otherwise coupled to the vehicle 102. The vehicle sensor data may be related to the operation of the vehicle 102. The one or more sensors may measure and/or detect driver behavior patterns, such as vehicle speed, steering wheel angle, frequency of lane changes, braking and/or other characteristics of a driver's driving patterns. By measuring the amount or rate of the braking or the steering wheel angle, the hazard detection system 100 may detect when a driver has an antilock braking or hard maneuvering event, such as a hard brake or turn, respectively, for example. In another example, the hazard detection system 100 may measure the acceleration of the vehicle and determine a sudden acceleration where the rate of acceleration exceeds a baseline acceleration.

For example, the hazard detection system 100 may use a vehicle speed sensor 116*b* to detect or measure the speed of the vehicle 102, e.g., by measuring the revolutions per minute of the one or more wheels of the vehicle 102 over time, and/or changes in the speed of the vehicle 102 over time. In another example, the hazard detection system 100 may use a steering wheel sensor 116*c* to detect or measure changes and/or rate of change in the angle of the steering 132, such as the angle of the steering wheel of the vehicle 102. In another example, the hazard detection system 100 may use a brake sensor 116*e* or an acceleration sensor 116*f* to measure the rate of the depression of the brake pedal of the vehicle 102 or the accelerator pedal of the vehicle 102, respectively. In some implementations, the hazard detection system may use one or more cameras 116*a* that monitor the passenger compartment and capture image data. The image data may be analyzed, such as by analyzing facial features or eye movements, to determine whether a driver of the vehicle 102 is drowsy, distracted, inebriated or otherwise incapacitated.

The hazard detection system 100 may obtain navigational map information, weather information and/or other information (204). The hazard detection system 100 may use the navigation unit 114 to obtain the navigational map information, weather information and/or other information from one or more external databases 104.

The navigational map information may include a current location or a route of the vehicle 102 including a starting location of the vehicle 102 and a destination location of the vehicle 102. The hazard detection system 100 may calculate the speed of the vehicle 102 and/or the direction of travel of the vehicle 102 over a period based on the change in the location of the vehicle 102 over the period. Moreover, the other information may include a location and/or a position of one or more other vehicles and/or the location of one or more known hazardous conditions, such as a pothole, black ice, a road construction area or other road hazard. In some implementations, the hazard detection system 100 may provide the current location of the vehicle 102 to the external database 104, and in response, receive other information that is specific to the current location of the vehicle, such as the traffic, density or position of one or more surrounding vehicles or the location of the one or more known hazardous conditions.

The weather information may include the type of weather present at the current location of the vehicle, such as whether there is rain, snow or other precipitation, wind shear, sun glare or other weather-related events. The weather information may include other details about the weather including the amount of precipitation, wind speed and/or other factors that may interfere with or affect the operation of a vehicle.

The hazard detection system 100 obtains environmental sensor data (206). The hazard detection system 100 may obtain environmental sensor data using one or more sensors 116. The environmental sensor data may be related to sensor data and/or image data collected of the surrounding environment of the vehicle 102 and may include driving patterns of one or more surrounding vehicles that are in proximity to the vehicle 102. The driving patterns of the one or more surrounding vehicles may include the speed, acceleration, deceleration, direction of travel, and/or other motions of the one or more surrounding vehicles.

For example, the hazard detection system 100 may use one or more cameras 116a to capture image data of the surrounding environment and use the image data to identify, detect or otherwise determine objects in the surrounding environment and the motions of the objects including the speed, direction of travel and other motions of the other vehicle. In another example, the hazard detection system 100 may use a proximity sensor 116d to detect objects within a threshold distance of the vehicle 102 and the various motions of the objects.

The hazard detection system 100 obtains or generates a baseline (208). The baseline may be used to determine whether there is a hazardous condition present and may represent the normal conditions, such as the movement of objects, within a normal environment at the current location. The normal conditions may include the normal driving behavior patterns of the driver of the vehicle 102 and/or the normal driving patterns of one or more vehicles at the current location of the vehicle 102. The baseline may include statistics specific to the location of the vehicle 102, such as vehicle traffic accident statistics, vehicle density, pedestrian accident statistics and/or pedestrian density, which may be used to identify or determine a hazardous condition.

The hazard detection system 100 may determine the baseline based on a frequency or pattern of the behavior or movement of one or more objects at the current location. When the driver behaves in a certain manner a threshold number of times or a threshold percentage, the hazard detection system 100 may associate the behavior as the normal behavior or driver behavior pattern. For example, when one or more drivers of one or more vehicles keep their eyes focused on the road when the one or more drivers are driving a threshold percentage of time, the hazard detection system 100 may associate the eyes being focused on the road as the baseline or normal behavior. In another example, when one or more drivers speed, change speeds, control the steering wheel or otherwise control a vehicle in a certain manner at a location a threshold amount of times, the hazard detection system 100 may determine that those driver behavior patterns are normal and part of the baseline for that location.

Similarly, when an environmental condition occurs more than a threshold amount of times or a threshold percentage of scenarios, the environmental condition may be considered normal and part of the baseline based on past data analyzed by artificial intelligence. For example, a trolley that regularly traverses the roadway in San Francisco, Calif. may be considered normal and part of the baseline for the location and time of day, but a hazardous condition and not part of the baseline for a different location, such as Alaska, and/or at a different time of day, such as midnight even in San Francisco.

Once the vehicle sensor data and the environmental sensor data are obtained or detected, the hazard detection system 100 determines whether the hazardous condition is present (210). The hazard detection system 100 may compare the vehicle sensor data and the environmental sensor data with the baseline to determine whether there is a hazardous condition is present. Moreover, the hazard detection system 100 may analyze the weather information to determine whether there is a hazardous condition present. For example, if the weather information indicates that there is heavy snowfall and the one or more sensors 116 detect environmental data that includes snowfall on the roadway, the hazard detection system 100 may determine that the snowfall is a hazardous condition.

Figure 3:
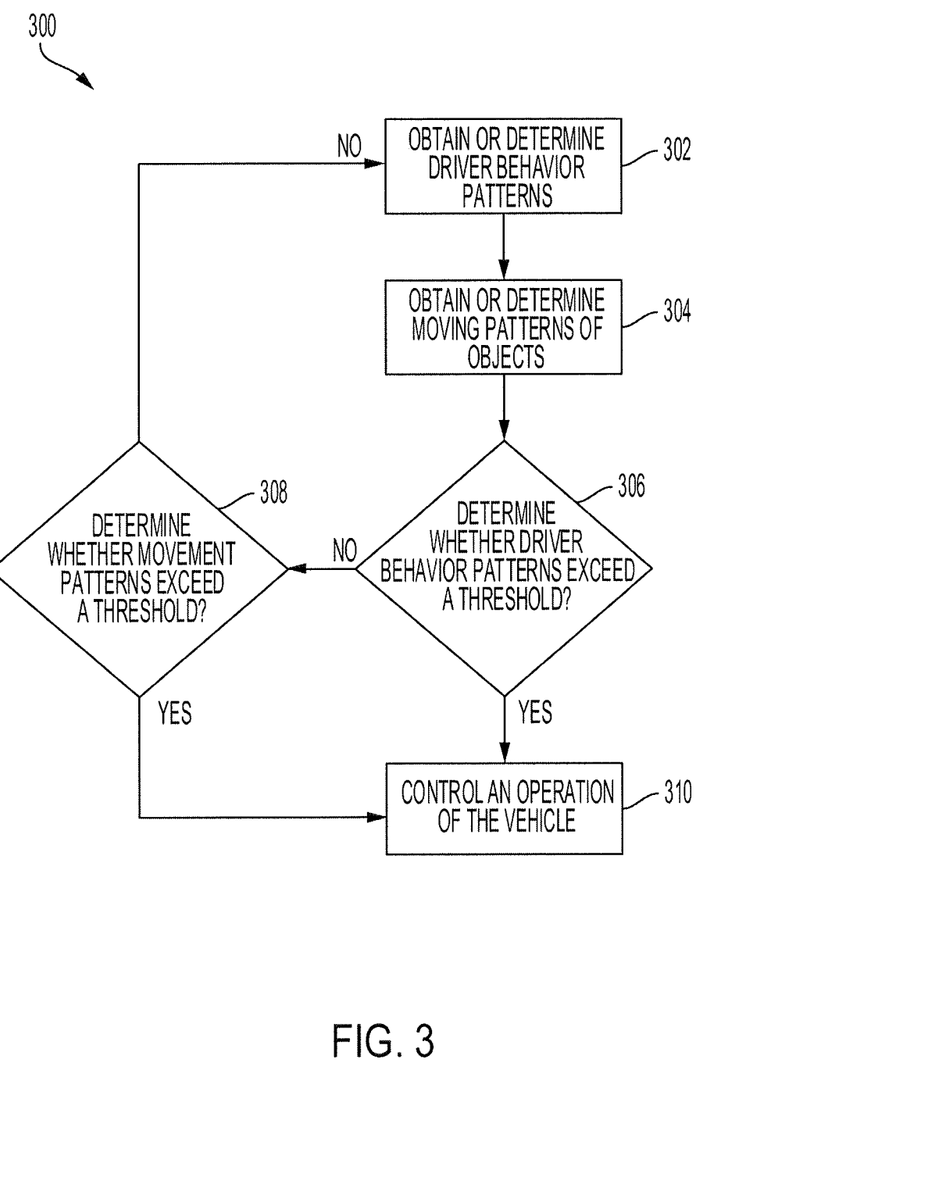
FIG. 3 is a flow diagram of an example process for detecting the hazardous condition using the hazard detection system of FIG. 1 according to an aspect of the invention.

In some implementations, the hazard detection system 100 may not depend on the comparison of the vehicle sensor data and the environmental sensor date with the baseline to determine that the hazard condition is present, but instead, the hazard detection system 100 may compare the vehicle sensor data and the environmental sensor data to a different threshold, such as a pre-configured threshold or setting. FIG. 3 further describes the process 300 for determining whether a hazard condition is present. If the hazard detection system 100 determines that there is no hazard condition present, the hazard detection system 100 continues to monitor the environment surrounding and within the vehicle 102. If the hazard detection system 100 determines that there is a hazard condition present, the hazard detection system 100 controls an operation of the vehicle 102 to mitigate, reduce, alert or otherwise notify that there is a hazard condition. For example, the hazard detection system 100 may send the alert to a server or external database along with a location to disseminate the location of the hazardous condition to other vehicles.

Figure 4:
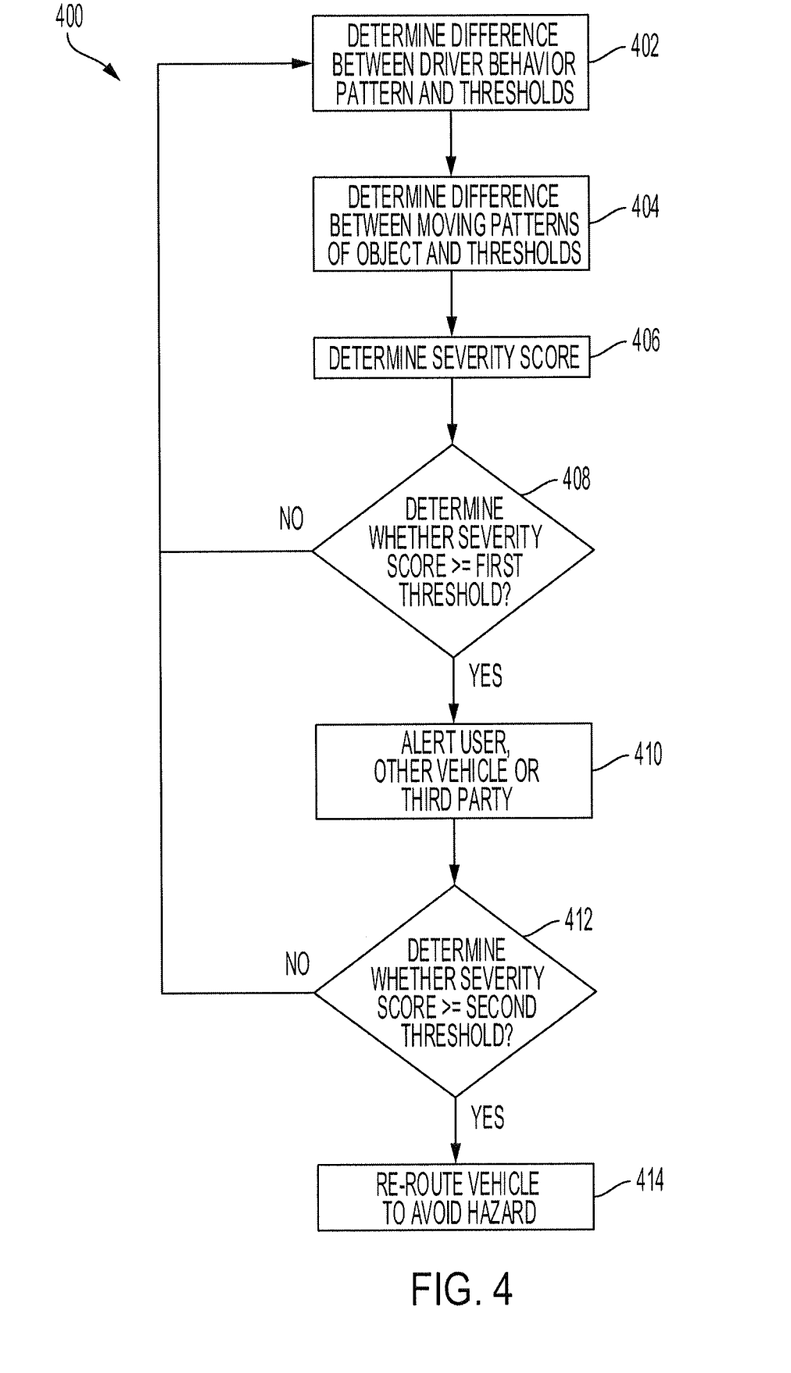
FIG. 4 is a flow diagram of an example process for determining the severity of the hazardous condition and determining the action to perform using the hazard detection system of FIG. 1 according to an aspect of the invention.

When the hazard detection system 100 detects or otherwise determines a hazard condition is present, the hazard detection system 100 may determine the severity of the hazardous condition (212). The severity of the hazardous condition may affect the response or type of control of the operation of the vehicle 102. FIG. 4 further describes the process for the hazard detection system 100 to determine the severity and control the operation of the vehicle 102 based on the severity.

The hazard detection system 100 controls the operation of the vehicle 102 (214). The control of the operation of the vehicle 102 may be in response to the determination that there is hazardous condition and may be based on the severity of the hazardous condition. The hazard detection system 100 may perform different operations for different severities of the hazardous condition, which is further described in FIG. 4. The hazard detection system 100 may perform operations, such as notify or alert the driver or occupants of the vehicle 102, other devices 106 and/or third-parties. The hazard detection system 100 may perform other operations including braking, changing lanes, re-routing the path of the vehicle 102 on the user interface 120, and/or autonomously steering the vehicle 102 onto the re-routed path or otherwise changing the path of the vehicle 102.

By alerting the driver of the hazardous condition, the driver is given the opportunity to rectify the problem, such as by paying more attention to the road, slowing down, changing lanes or otherwise adjusting their driving behavior. By alerting other drivers of the hazardous condition, the other drivers may avoid the hazardous condition or otherwise take preventive action, such as keeping a farther distance to allow for a larger reaction time. By alerting third parties, the third party may take corrective action. For example, an insurance provider may be a third party that increases the insurance payments or otherwise adjusts insurance rates of a driver whose driving patterns, based on sensor data, indicate the driver is impaired.

FIG. 3 is a flow diagram of a process 300 for detecting the hazardous condition. One or more computers or one or more data processing apparatuses, for example, the ECU 110 of the hazard detection system 100 of FIG. 1, appropriately programmed, may implement the process 300.

The hazard detection system 100 obtains, extracts or determines the driver behavior patterns from the vehicle sensor data (302). The hazard detection system 100 may use one or more sensors 116 to obtain the sensor data that includes the driver behavior patterns, as described above. The driver behavior patterns include the speed, the rate of change of the speed, the angle of the steering wheel, the rate of change of the angle of the steering wheel, the amount or rate of braking or acceleration, the level of distraction, drowsiness, inebriation or other characteristic of the driver of the vehicle 102, and other factors of the driver's behavior while driving the vehicle 102. The driver behavior patterns may also include the overall reaction time of the driver to one or more hazardous conditions, which may be derived from past encounters and responses to previously detected hazardous conditions.

The hazard detection system 100 obtains, extracts or determines moving patterns of objects in the environment from the environmental sensor data (304). The hazard detection system 100 may use one or more sensors 116 to obtain the environmental sensor data that includes the driving patterns of one or more surrounding vehicles, as described above, or one or more moving patterns of other objects. The moving patterns include patterns of movement of different objects including driving patterns of other surrounding vehicles. The patterns of movement include the speed, the rate of change of the speed, the relative distance between the other surrounding vehicle and the vehicle 102, the change in the relative distance, direction of travel of the surrounding vehicle and/or other factors of objects including vehicles in the surrounding environment of the vehicle 102.

The hazard detection system 100 determines whether driver behavior patterns including the speed, the rate of change of the angle of the steering wheel and/or the other driver behavior patterns exceeds a threshold (306). The threshold may be a baseline or a pre-configured value, which may be based on a current location of the vehicle, a time of data, the weather or other factor.

The hazard detection system 100 compares the driver behavior patterns including the speed, the rate of change of the angle of the steering wheel and the other driver behavior patterns to the threshold. If the value of the driver behavior pattern exceeds the threshold, the hazard detection system 100 controls an operation of the vehicle to alert, notify or mitigate consequences of the hazardous condition in response to the determination that the driver behavior pattern exceeds a corresponding threshold.

For example, the hazard detection system 100 may measure the change in the angle of the steering wheel or rate of change in the angle of the steering wheel. When the change in the angle of the steering wheel or the rate of change in the angle of the steering wheel exceeds a threshold amount, the hazard detection system 100 may determine that the vehicle 102 is swerving in and out of the lane of the roadway, which may indicate that the driver of the vehicle 102 is distracted, inebriated or otherwise not in control of the vehicle 102. In another example, the hazard detection system 100 may measure the amount of time that the eyes of the driver are not focused on the roadway, and if the amount of time is greater than a threshold, the hazard detection system 100 may determine that the driver is not in control of the vehicle 102. When the driver is not control of the vehicle 102, the hazard detection system may determine that there is a hazardous condition and controls an operation of the vehicle 102.

Otherwise, if the value of the driver behavior pattern does not exceed the threshold, the hazard detection system 100 analyzes the movement patterns of objects surrounding the environment and determines whether the movement patterns of objects in the surrounding environment of the vehicle 102 exceed a threshold (308). The threshold may be a baseline or a pre-configured value, which may be based on a current location of the vehicle, a time of data, the weather or other factor.

The hazard detection system 100 compares the relative movement patterns of the object including the relative speed, the relative rate of change of the speed, the relative distance between the object and the vehicle 102, the change in the relative distance, relative direction of travel of the object and/or other factors of the object with the threshold.

If the value of the movement pattern does not exceed the threshold, the hazard detection system 100 continues to monitor the environment within and surrounding the vehicle 102. Otherwise, if the value of the relative movement patterns of the object exceeds the threshold, the hazard detection system 100 determines that there is a hazardous condition.

The value may be a relative speed of another vehicle, the relative amount of movement of another vehicle inside and/or outside a lane and/or the relative distance between the other vehicle and the vehicle 102. The object may be a pothole, a tire, an accident, a branch or other object on or in proximity to the roadway.

For example, the hazard detection system 100 may measure the lateral motion of the vehicle in front of the vehicle 102 and when the lateral motion is greater than a threshold amount, the hazard detection system 100 may determine that the vehicle in front is swerving in and out of the lane of the roadway. In another example, the hazard detection system 100 may detect that the relative distance between the vehicle 102 and another vehicle is closing at rate that exceeds the threshold. When the hazard detection system 100 determines that the driving pattern of the vehicle exceeds the corresponding threshold, the hazard detection system 100 determines that there is a hazardous condition.

In some implementations, the hazard detection system 100 determines the threshold based on other driver factors, such as the driver's age or reaction time. The other driver factors may include the driver's reaction time to previously detected hazardous conditions. The reaction time may be derived from baseline driver behavior patterns stored within the baseline and may be used when determining whether there is a hazardous condition.

The hazard detection system 100 may perform the analysis of the driver behavior patterns and the movement patterns of the object locally using the ECU 110, and/or the hazard detection system 100 may perform the analysis remotely using one or more processors on a server or other cloud device that is connected via the network 108. In some implementations, a cursory analysis is performed using the ECU 110 and a follow-up analysis is performed using the one or more processors on the server or cloud device that is connected via the network 108.

The hazard detection system 100 controls an operation of the vehicle 102 to alert, notify or mitigate consequences of the hazardous condition in response to the determination that there is a hazardous condition (310). FIG. 4 further describes the control of the operation of the vehicle in response to the determination that there is a hazardous condition.

FIG. 4 is a flow diagram of a process 400 for determining the severity of the hazardous condition and determining the action to perform based on the severity using the hazard detection system of FIG. 1. One or more computers or one or more data processing apparatuses, for example, the ECU 110 of the hazard detection system 100 of FIG. 1, appropriately programmed, may implement the process 400.

After the hazard detection system 100 has determined that there is a hazardous condition, the hazard detection system 100 may control the operation of the vehicle 102 in response to the hazardous condition based on a severity of the hazardous condition. The severity of the hazardous condition may be an estimation of an amount of damage, harm or resulting consequence of the hazardous condition. Since various factors, such as the speed of the hazardous condition and/or vehicle 102, the amount that the driver is distracted, and/or the relative distance between the vehicle 102 and the hazardous condition, affect the severity of the hazardous condition, the hazard detection system 100 measures or calculates the magnitude of each of the factors to determine the severity.

The hazard detection system 100 may determine a difference between the driver behavior patterns and the threshold, such as the baseline (402). The hazard detection system 100 may determine the difference when the hazard detection system 100 determines whether driver behavior patterns including the speed, the rate of change of the angle of the steering wheel and/or the other driver behavior patterns exceed a threshold. The difference between the driver behavior patterns and the baseline may relate to the severity of the hazardous condition, either directly or indirectly.

For example, the hazard detection system 100 may determine the difference between the current speed or rate of change of speed of the vehicle 102 and an expected or baseline speed or rate of change of speed of the vehicle 102 from the baseline. If the difference is significant, this may indicate that the vehicle 102 is traveling much faster or much slower than the baseline, and thus, the vehicle 102 presents a more significant danger than when the vehicle 102 is traveling at the baseline speed. In another example, the hazard detection system 100 may measure the difference in the frequency of eye blinks compared to a baseline amount of eye blinks for the driver. If the difference is significant, this may indicate that the driver is more distracted, inebriated or otherwise unfocused in comparison to the baseline, and thus, the driver presents a more significant danger to oneself or others, which results in more severity associated with the hazardous condition.

The hazard detection system 100 may determine a difference between the moving patterns of objects and the threshold, such as the baseline (404). The hazard detection system 100 may determine the difference when the hazard detection system 100 determines whether the moving patterns of objects in the surrounding environment of the vehicle 102 exceed a threshold. The difference between the moving patterns of objects and the threshold may be related to the severity of the hazardous condition, either directly or indirectly.

For example, the hazard detection system 100 may determine the difference between the lateral motion of a vehicle in front of the vehicle 102 and an expected or baseline movement for a vehicle in front. Generally, vehicles stay within the lane and do not have significant lateral motion within the lane unless the vehicle is switching lanes, and thus, if the hazard detection system 100 determines that the difference in the lateral motion of the vehicle in front of the vehicle 102 and the threshold or baseline is significant, e.g., greater than a threshold amount, this may indicate the vehicle in front is moving inside and outside the lane and that the vehicle presents a more hazardous condition.

In another example, the hazard detection system 100 may use one or more sensors 116 to measure the amount of precipitation at the current location at a current time and determine the difference between the amount of precipitation and the threshold. If the difference is significant, this may indicate that there is more accumulated precipitation on the roadway than normal and the likelihood of an accident increases, and so, the severity of the hazardous condition also increases. In another example, the hazard detection system 100 uses the environmental sensor data and determines a relative distance between another object, such as another vehicle, and the vehicle 102. If the difference in the relative distance between vehicle 102 and the other object is less than the threshold, such as within 5-6 feet of the vehicle 102, the hazard detection system 100 may determine that there is a hazardous condition. Once the hazard detection system 100 determines that the other object is within the threshold, the severity of the hazardous condition may increase the closer the other object is to the vehicle 102, i.e. as the relative distance decreases further beyond the threshold the severity increases.

The hazard detection system 100 may determine a severity score (406). The severity score indicates the potential severity of the hazardous condition, such as the amount of danger that the hazardous condition presents, and/or the severity of the resulting consequences of the hazardous condition, such as the amount of damage that the hazardous condition may cause. The hazard detection system 100 may use the severity score to determine a response to avoid, prevent or otherwise mitigate consequences of the hazardous condition. The severity score may be based on the differences between the driver behavior patterns and corresponding thresholds for the driver behavior patterns and between the moving patterns of objects and corresponding thresholds for the moving patterns of the objects. The hazard detection system 100 may use a weighted combination of the differences between the driver behavior patterns and moving patterns of objects and their corresponding thresholds to determine the severity score.

Once the severity score is determined, the hazard detection system 100 determines whether the severity score is greater than a low threshold score (408). The low threshold score may indicate that a hazardous condition exists but there is time to prevent or remedy the hazardous condition and/or there is a low degree of danger or consequence, which is unlike a high threshold score. The hazard detection system 100 may have any number of thresholds that may result in any number of different responses.

In these instances when the hazard detection system 100 determines that the severity score is greater than the low threshold score, the hazard detection system 100 may alert the user via the user interface 120, alert one or more other devices 106 via the network access device 118, and/or provide the alert to the third party (410). The hazard detection system 100 may include information, such as environmental sensor data and/or vehicle sensor data, and/or a suggestion or recommendation, such as to accelerate, brake, decelerate or change lanes, in the alert. The environmental sensor data and/or vehicle sensor data may include image data, such as an image of the driver when the driver is distracted or an image of the license plate of the vehicle in front that is swerving.

After alerting the user, the one or more other devices 106 and/or providing the alert to the third party, the hazard detection system 100 may determine whether the severity score is greater than or equal to a high threshold score (412). A high threshold score may be greater than the low threshold score and may indicate that the hazardous condition is imminent and/or there is a high degree of danger or consequence.

When the hazard detection system 100 determines that the score is greater than or equal to the high threshold score, the hazard detection system 100 may re-route the vehicle 102 to avoid the hazard (414). The hazard detection system 100 may perform other operations to the vehicle 102, such as activating the brakes, shifting lanes or otherwise actively avoiding the hazardous condition.

Figure 5:
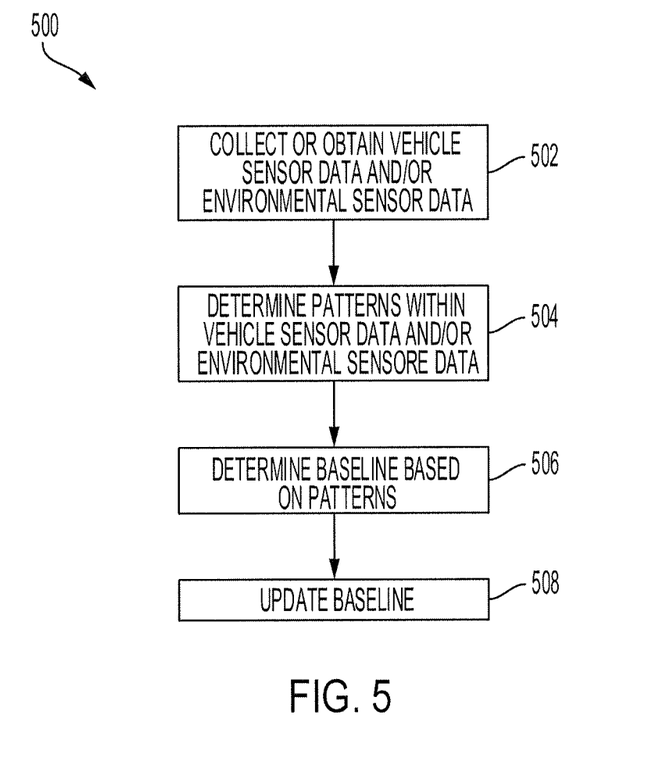
FIG. 5 is a flow diagram of an example process for generating, establishing or otherwise determining a baseline using the hazard detection system of FIG. 1 according to an aspect of the invention.

FIG. 5 is a flow diagram of an example process 500 for generating, establishing or otherwise determining a baseline. One or more computers or one or more data processing apparatuses, for example, the ECU 110 of the hazard detection system 100 of FIG. 1 or a processor of an external database 104 of the hazard detection system 100 of FIG. 1, appropriately programmed, may implement the process 500.

The hazard detection system 100 collects vehicle sensor data and environmental sensor data from a variety of sources (502). The hazard detection system 100 may collect, crowd-source or otherwise obtain the vehicle sensor data and the environmental sensor data using the one or more sensors 116 on multiple vehicles and/or using one or more sensors on other devices 106 or traffic infrastructure. Other sources may include image data, such as video pulled from the social networks or the web, vehicle dashcams and/or other devices 106. The vehicle sensor data and the environmental sensor data may be collected for different locations at different times of day using the variety of sources. In some implementations, the hazard detection system 100 may collect other data, such as weather information and/or road condition information, to supplement the vehicle sensor data and the environmental sensor data.

For example, the hazard detection system 100 may capture the eye movements of different drivers, the speeds of different vehicles, angles of the steering 132 of the different vehicles and/or other driver behavior patterns of different drivers of different vehicles during multiple different trips. In another example, the hazard detection system 100 may capture the movement of different objects, such as vehicles, within an environment including the speed and direction of travel of the objects using multiple sensors on different vehicles or on the traffic infrastructure.

The hazard detection system 100 determines patterns within the vehicle sensor data, the environmental sensor data and other data (504). The hazard detection system 100 may use a neural network that reads all the collected vehicle sensor data, the environmental sensor data and/or other data and determines the patterns to form the baseline, which is used to detect the hazardous conditions. The baseline may include the patterns and statistics related to the patterns of the vehicles that frequented the location. The statistics may include the number of traffic accidents, the density of the vehicle traffic and/or pedestrian traffic, the speed of the vehicle traffic and other traffic related information. The baseline may also include driver behavior patterns, such as the way the driver operates the vehicle 102, and/or other data, such as the amount of precipitation, wind speed or other weather hazards including ice or snow patches. The baseline may include many factors regarding the determination of the patterns, such as the location of the detected hazardous condition and/or the timing or duration of a hazardous condition, such as an amount of time required for an ice patch to melt.

The neural network may be trained at the manufacturer or by other devices 106 in the field, such as vehicles in the field. In some implementations, a first level of the neural network within the ECU 110 may perform an initial pattern analysis of the vehicle sensor data and/or the environmental sensor data such as when there is more of an urgency and a second level of the neural network within a processor of the server or external database 104 may perform a more extensive pattern analysis of the vehicle sensor data and/or the environmental sensor data.

The hazard detection system 100 may track the patterns including the driver behavior patterns and/or the movement patterns of the objects. If the driver behavior patterns and/or the movement patterns are repeated several times, the hazard detection system 100 may determine that there is a pattern of motions and those motions are part of the baseline. For example, when a driver brakes, the driver typically slowly depresses the brake at a near constant or constant rate and the vehicle 102 correspondingly slows at a certain rate, and so, when the driver depresses the brake at the near constant or constant rate a number of times greater than a threshold amount, the near constant or constant rate would be considered normal and part of the baseline. And so, when the driver deviates from the near constant or constant rate a threshold amount, the hazard detection system 100 may determine that the driver is slamming on the brakes, which presents a hazardous condition.

In another example, when a vehicle is driving, the vehicle typically drives straight and stays within a lane boundary. Generally, the vehicle does not move laterally unless shifting, merging or otherwise exiting the lane boundary. Moreover, when the vehicle shifts, merges or otherwise exits the lane boundary, the vehicle rarely returns to the vehicle's original position within the original lane. Thus, the lateral motion of a vehicle is often limited, which would be considered normal and part of the baseline. And so, when a vehicle deviates from the limited lateral motion to have a varied lateral motion back and forth more than the threshold amount, the hazard detection system 100 may determine that the vehicle is swerving and there is a hazardous condition.

Once the patterns are determined, the hazard detection system 100 establishes or determines the baseline based on the patterns (506). When the patterns are repeated a number of times or occur in a percentage of the data collected for the location, the hazard detection system 100 may determine that the pattern is part of the baseline. When the hazard detection system 100 detects movement patterns or driver behavior patterns that deviate from the baseline, the hazard detection system 100 may identify those behaviors as hazardous conditions. Thus, the hazard detection system 100 can learn and detect poor driving either from the driver or other drivers using the baseline.

As the hazard detection system 100 collects more vehicle sensor data and environmental sensor data from different sources at different times, the hazard detection system 100 may continuously update the baseline (508). For example, as a specific movement, e.g., speed or direction of travel, of an object appears more frequently and/or is present in a larger percentage of the sample size, the hazard detection system 100 may increase a likelihood that that the specific movement of the object is normal and is more likely part of the baseline. Whereas, if the movement of the object appears less frequently and/or is present in a smaller percentage of the sample size, the hazard detection system 100 may decrease a likelihood that the movement of the object is normal and is less likely part of the baseline. The percentage or frequency necessary for inclusion in the baseline may be pre-determined and/or user-configured. Thus, when the percentage or frequency necessary is exceeded, the hazard detection system 100 updates the baseline with the repeated pattern. The hazard detection system 100 may receive the vehicle sensor data and the environmental sensor data from multiple vehicles and be provided regular or periodic updates of the vehicle sensor data and the environmental sensor data to update the baseline. The data from the different vehicles may be weighted differently based on a confidence factor associated with the vehicle, which represents the accuracy and/or precision of the data provided by the corresponding vehicle.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A hazard detection system for a vehicle, comprising:
   a first sensor configured to detect or measure sensor data associated with an operation of the vehicle and including driver behavior patterns;
   a second sensor configured to capture image data associated with driving patterns of another vehicle within a surrounding environment of the vehicle; and
   an electronic control unit coupled to the first sensor and the second sensor and configured to:
   obtain the sensor data and the image data,
   determine that a hazardous condition is present based on the driver behavior patterns or the driving patterns of the other vehicle,
   estimate an amount of damage that would be caused by the hazardous condition, and
   provide an alert that includes the image data when the amount of damage that would be caused by the hazardous condition exceeds a first threshold.

2. The hazard detection system of claim 1, wherein electronic control unit is configured to:
   obtain a baseline of the driving patterns of the other vehicle and the driver behavior patterns; and
   determine that the hazardous condition is present further based on the baseline.

3. The hazard detection system of claim 1, wherein the electronic control unit is configured to:
   re-route the vehicle to avoid the hazardous condition when the estimated amount of damage that would be caused by the hazardous condition is greater than a second threshold.

4. The hazard detection system of claim 1, wherein the first sensor is a vehicle speed sensor and the driver behavior patterns include a speed of the vehicle.

5. The hazard detection system of claim 4, wherein to determine that the hazardous condition is present based on the driver behavior patterns or the driving patterns of the other vehicle the electronic control unit is configured to:
   determine a difference between a speed of the vehicle and a baseline speed; and
   determine that the difference is greater than a threshold amount.

6. The hazard detection system of claim 1, wherein the electronic control unit is configured to:
   obtain a baseline of driving patterns of a plurality of vehicles;
   wherein to determine that the hazardous condition is present is further based on the baseline of the driving patterns of the plurality of vehicles.

7. The hazard detection system of claim 1, further comprising:
   a navigation unit configured to obtain or determine a current location of the vehicle;
   wherein the electronic control unit is configured to provide the current location of the vehicle to an external database, and in response, obtain driving patterns of a plurality of vehicles that previously frequented the current location.

8. The hazard detection system of claim 7, wherein to determine that the hazardous condition is present is further based on the driving patterns of the plurality of vehicles that previously frequented the current location.

9. A hazard detection system for a vehicle, comprising:
   a sensor configured to detect sensor data including driver behavior patterns of a driver of the vehicle or driving patterns of one or more other vehicles;
   a memory configured to store baseline driver behavior patterns and baseline driving patterns of the one or more other vehicles; and
   an electronic control unit coupled to the sensor and configured to:
   determine that a hazardous condition is present based on the driver behavior patterns or the driving patterns of the one or more other vehicles,
   estimate an amount of damage that would be caused by the hazardous condition based on a comparison of the driver behavior patterns to the baseline driver behavior patterns and the driving patterns of the one or more vehicles to the baseline driving patterns, and
   control an operation of the vehicle to avoid the hazardous condition when the amount of damage that would be caused by the hazardous condition exceeds a threshold.

10. The hazard detection system of claim 9, wherein to control the operation of the vehicle to avoid the hazardous condition the electronic control unit is configured to alert a driver of the vehicle, the one or more other vehicles or another entity of the hazardous condition.

11. The hazard detection system of claim 9, wherein the sensor is a steering wheel angle sensor, wherein the driver behavior patterns include a rate of change of an angle of a steering wheel of the vehicle, wherein to determine that the hazardous condition is present the electronic control unit is configured to:

determine a difference between the rate of change of the angle of the steering wheel of the vehicle and a baseline rate of change of the angle of the steering wheel; and determine that the difference is greater than a threshold amount.

12. The hazard detection system of claim 9, wherein to control the operation of the vehicle to avoid the hazardous condition the electronic control unit is configured to:
re-route the vehicle to avoid the hazardous condition.

13. The hazard detection system of claim 9, further comprising:
a camera configured to capture image data, wherein the electronic control unit is configured to send an alert that includes the image data to a user in response to determining that the hazardous condition is present.

14. The hazard detection system of claim 9, further comprising:
a navigation unit configured to obtain or determine a current location of the vehicle;
wherein the electronic control unit is configured to:
provide the current location of the vehicle to an external database, and
in response, obtain the baseline driver behavior patterns and the baseline driving patterns of the one or more other vehicles for the current location of the vehicle.

15. A method for detecting a hazardous condition, comprising:
obtaining, from sensor data, driver behavior patterns of a driver of a vehicle and driving patterns of a surrounding vehicle;
determining that a hazardous condition is present based on the driver behavior patterns and the driving patterns of the surrounding vehicle;
comparing the driver behavior patterns of the driver to normal driver behavior patterns stored in memory and the driving patterns of the surrounding vehicle to normal driving patterns of the surrounding vehicle stored in the memory;
estimating an amount of damage that would be caused by the hazardous condition based on the comparisons; and
providing an alert of the hazardous condition when the amount of damage that would be caused by the hazardous condition exceeds a threshold.

16. The method of claim 15, further comprising:
determining a severity score based on the comparisons and the amount of damage that would be caused by the hazardous condition.

17. The method of claim 16, further comprising re-routing the vehicle to avoid the hazardous condition based on the severity score.

18. The method of claim 15, further comprising:
determining that the driving patterns of the surrounding vehicle include a vehicle swerving between two lanes of a roadway.

19. The method of claim 18, wherein determining that the hazardous condition is present is based on the determination that the driving patterns of the surrounding vehicle include the vehicle swerving between the two lanes of the roadway.

20. The method of claim 15, wherein the driver behavior patterns of the driver and the driving patterns of the surrounding vehicle include at least one of a speed, a rate of change of the speed, an angle of a steering wheel or a rate of change of the angle of the steering wheel, or an amount or rate of braking or acceleration.

* * * * *